No. 701,144. Patented May 27, 1902.
L. H. BROWNSELL.
AXLE NUT WRENCH.
(Application filed Dec. 30, 1901.)
(No Model.)

WITNESSES:
H. A. Lamb
M. O. Laughlin

INVENTOR
L. H. Brownsell
BY
ATTORNEY

UNITED STATES PATENT OFFICE.

LAWRENCE H. BROWNSELL, OF BREWSTER, NEW YORK.

AXLE-NUT WRENCH.

SPECIFICATION forming part of Letters Patent No. 701,144, dated May 27, 1902.

Application filed December 30, 1901. Serial No. 87,815. (No model.)

*To all whom it may concern:*

Be it known that I, LAWRENCE H. BROWNSELL, a citizen of the United States, residing at Brewster, in the county of Putnam and State of New York, have invented certain new and useful Improvements in Axle-Nut Wrenches; and I do hereby declare the following to be a full, clear, and exact description of the invention, such as will enable others skilled in the art to which it appertains to make and use the same.

My invention relates to certain new and useful improvements in axle-nut wrenches, and has for its object simplicity of construction, efficiency, and readiness of use; and with these ends in view my invention consists in certain details of construction and combination of parts, such as will be hereinafter fully described and then specifically be designated by the claims.

Figure 1:
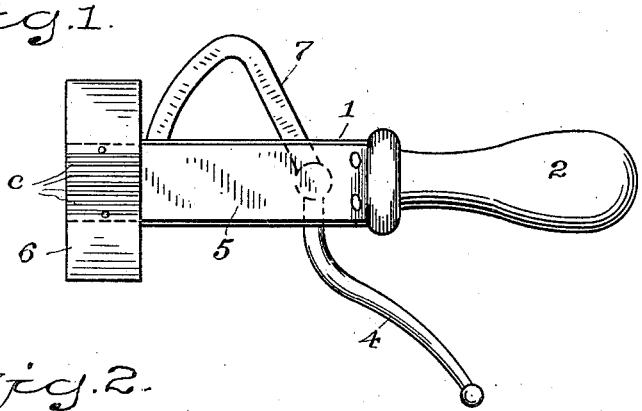
Figure 2:
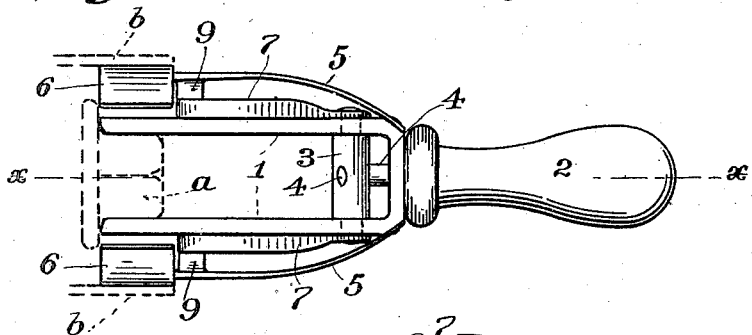
Figure 3:
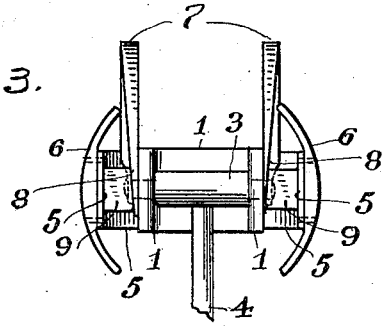
Figure 4:
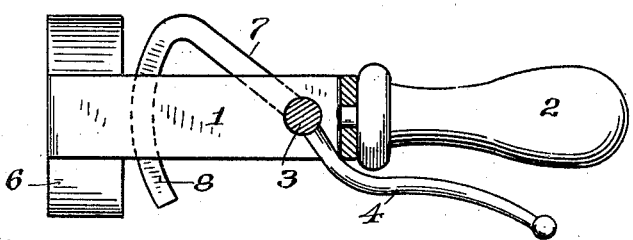

In the accompanying drawings, which form a part of this application, Figure 1 is a side elevation of my improvement; Fig. 2, a plan view; Fig. 3, an end view, and Fig. 4 a section at the line $x\,x$ of Fig. 2.

Similar characters of reference denote like parts in the several figures of the drawings.

My invention aims to remove and replace the axle-nut of a vehicle-wheel without actually handling the nut and without any likelihood of the latter dropping to the ground or becoming misplaced.

My improvement comprises a spanner 1, at the rear end of which is secured in any suitable manner a handle 2, while within this spanner is journaled any suitable rock-shaft 3. 4 is a crank-lever secured to this rock-shaft and suitably shaped and disposed in convenient proximity to the handle 2.

5 represents resilient plates secured at their rear ends to the heel end of the spanner, on opposite sides thereof, and having secured to their outer ends arcuate-shaped jaws 6, which are serrated, as shown at $c$, on their outer surfaces for the purpose presently to be explained.

7 represents hook-shaped levers secured at their rear ends to the extremities of the shaft 3 outside the spanner 1, the lower downwardly-projecting ends of these hook-shaped levers being wedge-shaped, as shown at 8.

9 represents suitable blocks secured to the inner faces of the resilient plates 5.

When suitably assembled, the lower or depending ends of the hook-shaped levers 7 project between the blocks 9 on opposite sides of the spanner 1, and when the crank-lever 4 is moved or drawn toward the handle 2 these wedge-shaped ends 8 will be thrown downwardly and will be forced against the blocks 9, thereby spreading the jaws 6.

In utilizing my improvement the spanner is engaged with the axle-nut, which latter is shown in dotted lines at Fig. 2 and is indicated by the letter $a$. The crank-lever 4 is now thrown toward the handle 2, thereby forcing the jaws 6 firmly against the inner wall of the wheel-hub, which latter is shown in dotted lines at Fig. 2 and indicated by the letter $b$, the serrated parts $c$ enabling the outer surfaces of these jaws 6 to maintain a firm grip on this inner face of the hub. The wheel is now grasped by the spokes and given a turn to the left, which will cause the axle-nut to be loosened and backed off from the axle, so that the wheel may readily be removed. When the wheel is removed, the axle-nut always remains held within the hub by means of my improvement, so that the wheel may be readily replaced and the axle-nut driven upon the shaft by turning the wheel to the right.

Of course the blocks 9 may be dispensed with and the plates 5 or levers 7 so shaped that the downward movement of said levers will effect the spreading of these plates, and I do not wish to be limited to the use of these blocks, the gist of my invention in this respect resting in the broad idea of wedging the jaws 6 apart by the downward throw of these levers 7.

I am aware that various devices have been contrived for removing axle-nuts in which a device is clamped both to the nut and to the hub of the wheel, and I therefore do not wish to be understood as making any broad claim for this construction; but What I do claim as new, and desire to secure by Letters Patent, is—

1. In an axle-nut wrench, the combination of a spanner, resilient jaws secured to said spanner on opposite sides thereof, a rock-shaft journaled within said spanner and having a crank-lever secured thereto, and the hook-shaped arms secured to said shaft and having their free ends depending between said spanner and jaws and having a wedging contact therewith, substantially as set forth.

2. In an axle-nut wrench, the combination of the spanner, the resilient jaws secured at their rear ends to the heel end of said spanner, the hook-shaped levers pivoted to said spanner and having their forward free ends extending between said spanner and jaws in wedging contact therewith, and means for operating said jaws in unison, substantially as set forth.

In testimony whereof I affix my signature in presence of two witnesses.

LAWRENCE H. BROWNSELL.

Witnesses:
JAMES E. MALLETTE,
FREDRICK HOERLE.